May 8, 1923.
M. R. RENTCHLER
FLEXIBLE SCREW DRIVER
Filed May 1, 1922
1,454,789
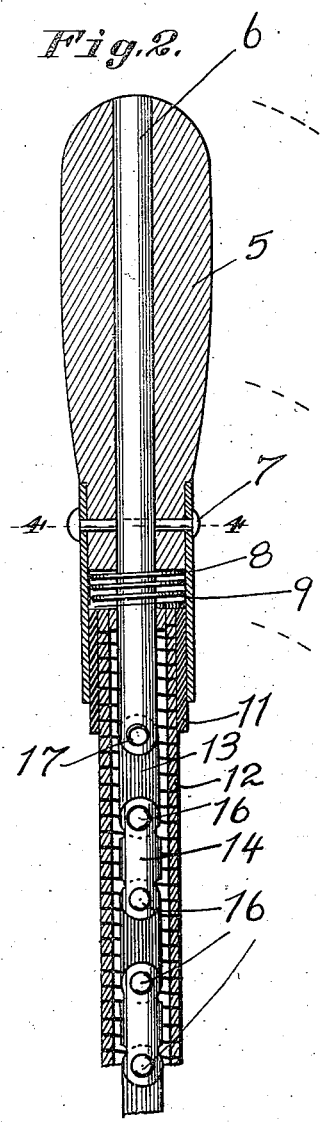
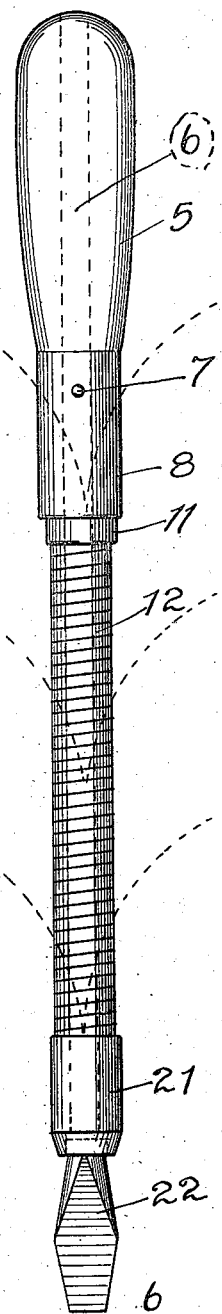
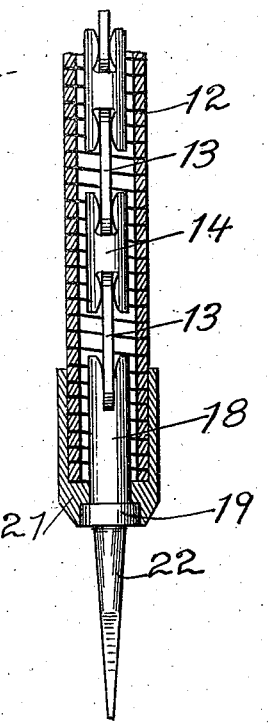
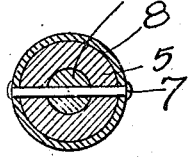
Inventor.
Maurice R. Rentchler,
By Victor J. Evans
Attorney.

Patented May 8, 1923.

1,454,789

UNITED STATES PATENT OFFICE.

MAURICE R. RENTCHLER, OF LOS ANGELES, CALIFORNIA.

FLEXIBLE SCREW DRIVER.

Application filed May 1, 1922. Serial No. 557,501.

*To all whom it may concern:*

Be it known that I, MAURICE R. RENTCHLER, a citizen of the United States, residing at Los Angeles, in the county of Los Angeles and State of California, have invented new and useful Improvements in Flexible Screw Drivers, of which the following is a specification.

This invention relates to improvements in flexible screw drivers.

The principal object of this invention is to construct a screw driver which may be employed in places which are inaccessible for screw drivers of the rigid type.

A still further object is to construct a screw driver of this character which will be sturdy, economical to manufacture, simple in construction, and highly efficient in use.

Other objects and advantages will be apparent during the course of the following description.

In the accompanying drawings forming a part of this specification, and in which like numerals are employed to designate like parts throughout the same, Fig. 1 is a side elevation of my screw driver, Fig. 2 is an enlarged fragmentary cross section of the handle and a portion of the screw driver, Fig. 3 is an enlarged fragmentary section of the lower portion or tool engaging end of my screw driver, and Fig. 4 is a cross section taken on the line 4—4 of Figure 2.

It is a well known fact that it is often difficult to engage the head of a screw for the purpose of turning the same owing to the inaccessibility of the screw head to a straight line screw driver, and it is to remedy this condition that I have constructed my screw driver which has a flexible central portion for the purpose of allowing the tool to be out of axial alignment with the handle thereby allowing the screw driver to be bent around a corner or other obstruction.

In the accompanying drawings wherein for the purpose of illustration is shown a preferred embodiment of my invention, the numeral 5 designates a handle provided with a central bore within which is mounted a rod 6. This rod is held within the handle as by a pin 7, which pin also serves to maintain a ferrule 8 upon the lower extremity of the handle 5. It will be observed that the ferrule 8 extends for some distance beyond the handle 5 and provides a socket for a helical expansion spring 9. One end of this spring is adapted to contact the handle 5 while the opposite end is adapted to contact the extremity of a bushing 11. This bushing 11 is secured upon the end of a flexible casing 12. I have preferably formed this casing of coiled metal, which construction is common in the casing on various flexible shafts. This casing is adapted to house a flexible shaft which is composed of male links 13 and female links 14, the links being secured together as by pins 16. The uppermost link 13 is secured to the rod 6 by a pivot connection as shown at 17. The female links 14 are formed as is best shown in Figure 3, in order that a universal flexibility may be secured. The lowermost link 13 is secured to a tool shank 18, which tool is provided with a shoulder 19 which is adapted to rest within a ferrule 21 secured upon the lower extremity of the casing 12. The numeral 22 designates a tool which is secured to the shank 18 in any convenient manner.

The operation of my device is as follows:—

The operator places the tool 22 in the slot of a screw and grasps the casing 12 in one hand and the handle 5 in the other. By now rotating the handle 5 the tool 22 will be rotated. Should it be necessary to bend the casing 12 in order to avoid obstruction the same may be done as indicated in dotted line in Fig. 1. When flexing the casing the compression spring 9 will expand or contract as necessity demands, thereby taking up any looseness which would otherwise occur. It will thus be seen that I have provided a very simple screw driver which may be universally used either as a straight drive or as a flexible drive.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

In a screw driver, the combination with a handle, of a rod secured in said handle, a ferrule secured on said handle, a casing having an end portion extending into said ferrule, a spring mounted between said handle and said casing, a flexible shaft extending through said casing and a tool mounted on said shaft and at a point adjacent the extremity of said casing.

In testimony whereof I affix my signature.

MAURICE R. RENTCHLER.